United States Patent [19]
Driesel

[11] Patent Number: 4,998,371
[45] Date of Patent: Mar. 12, 1991

[54] FISHING LURE

[76] Inventor: Will Driesel, R.R. #4, Box 41-A, Broken Bow, Okla. 74728

[21] Appl. No.: 451,569

[22] Filed: Dec. 18, 1989

[51] Int. Cl.⁵ .............................................. A01K 85/00
[52] U.S. Cl. .................................... 43/42.16; 43/42.49
[58] Field of Search .................. 43/42.49, 42.16, 42.11, 43/42.13, 42.14, 42.15, 42.16, 42.17, 42.18, 42.19; 24/116 A; 59/95

[56] References Cited

U.S. PATENT DOCUMENTS

| | | | |
|---|---|---|---|
| 2,612,715 | 10/1952 | Wadlington et al. | 43/42.16 |
| 2,745,206 | 5/1956 | Gaw | 43/42.06 |
| 3,110,979 | 11/1963 | Woodley | 43/42.16 |
| 3,192,660 | 7/1965 | Guess | 43/42.16 |
| 4,012,862 | 3/1977 | Dubois | 43/42.11 |
| 4,625,448 | 12/1986 | Borders | 43/42.11 |
| 4,671,007 | 6/1987 | Stanczyk | 43/42.11 |
| 4,745,700 | 5/1988 | Davis | 43/42.11 |

Primary Examiner—Richard K. Seidel
Assistant Examiner—James Miner
Attorney, Agent, or Firm—Laney, Dougherty, Hessin & Beavers

[57] ABSTRACT

A fishing lure which includes a generally ellipsoidal body having an elongated wire shaft extending centrally therethrough and projecting from the opposite sides of the body. The wire shaft has an eye on one of its ends spaced from the body for attaching a retrieving line. On its other end, the wire shaft carries a hook, and, in a preferred embodiment, a buck tail. The fishing lure further includes a spinner blade assembly connected to a span of the wire shaft between the eye and the body. The spinner blade is connected so that it is free to rotate through 360°, and free to rotate about the elongated wire shaft no matter at what angle the wire shaft extends to the portion of the spinner blade assembly which connects the spinner blade to the wire shaft. The spinner blade assembly includes a hollow swivel barrel into which wires having small spherical bearing elements on the ends thereof are extended through holes in opposite sides of this barrel, with one of the wires rotatably connected to the wire shaft, and the other connected to the spinner blade.

1 Claim, 1 Drawing Sheet

FISHING LURE

FIELD OF THE INVENTION

This invention relates to fishing lures, and more particularly, to a spinner bait in which, during retrieve, a spinner blade rotates about a substantially horizontal axis at a location above the spinner bait body.

BACKGROUND OF THE INVENTION

1. Brief Description of the Prior Art

A number of types of spinner bait fishing lures have previously been devised which rely upon, or utilize, polished metal spinner blades which are intended to rapidly rotate when the lure is retrieved. In some spinner baits which include a heavy central body, the spinner blade is attached to an elongated wire extended through the central body by means of a clevis. Because of this type of connection, the spinner blade is impaired in its ability to freely rotate about a horizontal axis at a time when the lure is retrieved so that it extends at a relatively sharp or large angle to the horizontal. In this case, the spinner blade will be caused, from time-to-time, to bang against the body or attempt to rotate around the elongated wire shaft which extends through the body, but the clevis then tends to cause the spinner blade to bind up and fail to rotate.

2. Brief Description of the Present Invention

The present invention provides an improved spinner bait-type fishing lure in which the spinner blade is free to rotate rapidly about a horizontal axis, no matter what the attitude of the lure with respect to the horizontal.

Broadly described, the spinner blade fishing lure of the invention includes generally an ellipsoidally shaped, heavy body located at the center of the lure and having an elongated wire shaft extending centrally therethrough so that it projects from the opposite ends of the body. The wire shaft has an eye on one of its ends which is used for attaching a retrieving line to the lure. This eye is spaced from the body, and is separated therefrom by a plurality of spherical spacer elements slidably carried on the wire shaft.

On its other end, the wire shaft carries a hook. In a preferred embodiment, a buck tail fly may be provided which helps to camoflage the hook at this location. The spinner bait further includes a spinner blade assembly which is rotatably connected to a span of the wire shaft between the retrieving line eye and the body. The spinner blade assembly is connected to the wire shaft so that it is free to rotate through 360°, and is free to rotate about the shaft no matter what angle the wire shaft extends to the portion of the spinner blade assembly which connects the spinner blade to the shaft.

The spinner blade assembly includes a hollow housing or barrel into which short wires are extended. Each of these short wires preferably carries small spherical bearing elements at an end located within the barrel. These spherical bearing elements, located inside the hollow swivel barrel, enable the barrel to swivel or rotate about the bearing elements. This enables the spinner blade which is connected to the barrel to freely swivel about a horizontal axis during all modes and attitudes assumed by the lure when it is retrieved.

An important object of the invention is to provide a spinner bait-type fishing lure which includes a brightly polished spinner blade mounted to a central elongated wire shaft of the lure so that the spinner blade can rotate about the wire shaft in any attitude the shaft may assume, and so that the spinner blade is free to rotate about a horizontal axis. This is effected by means of a novel swivel assembly by means of which the swivel blade is connected to the elongated wire shaft of the lure.

Another important object of the invention is to provide a spinner blade lure which is sturdy in its construction, reliable in its operation and characterized in having a long and trouble free operating life.

Additional objects and advantages of the lure of the invention will be come apparent as the following detailed description of a preferred embodiment of the invention is read in conjunction with the accompany drawings which illustrate such preferred embodiment.

GENERAL DESCRIPTION OF THE DRAWINGS

DETAILED DESCRIPTION OF A PREFERRED EMBODIMENT OF THE INVENTION

Figure 1:
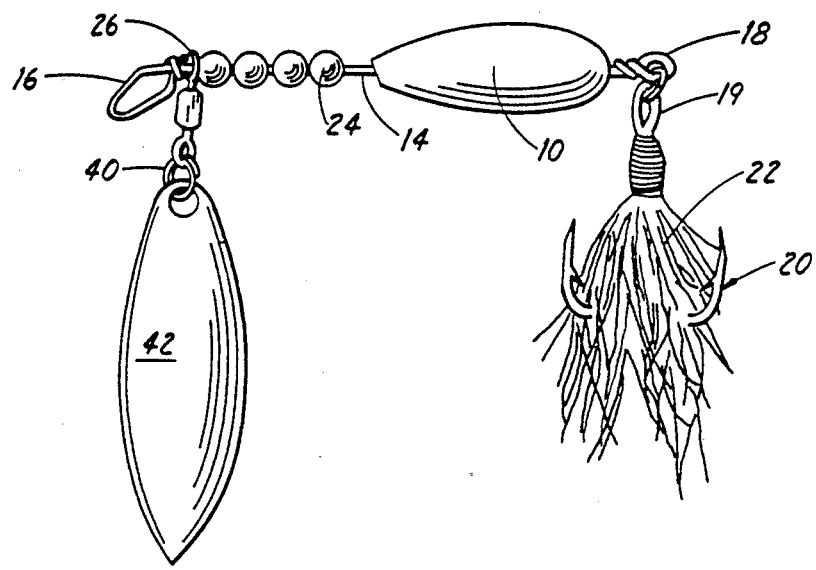
FIG. 1 is a side elevation view of the fishing lure of the invention.
Figure 2:
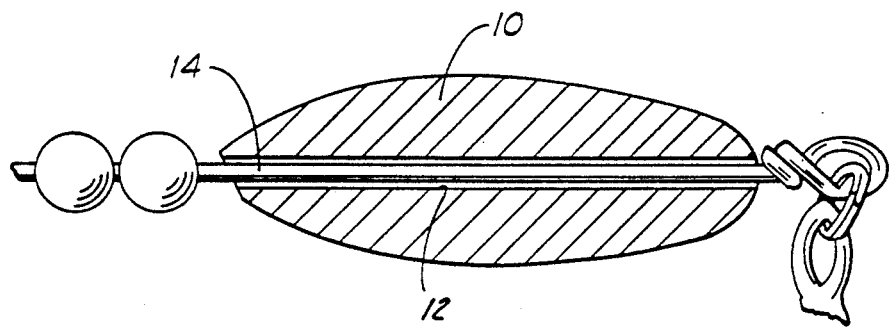
FIG. 2 is a view, partially in section and partially in elevation, of the central body of the fishing lure.

Referring to FIG. 1, the fishing lure of the invention includes a centrally located body 10 which is preferably constructed of lead, but may be constructed of a high density synthetic resin material. The body 10 is of generally ellipsoidal configuration. A bore is formed axially through the center of the body to accommodate the extension therethrough of an elongated wire shaft 14. The elongated wire shaft 14 has first and second ends.

At the first end of the wire shaft, an eye can either be attached to the shaft or, in a preferred embodiment, formed integrally with the shaft by bending the wire shaft about to form the eye 16 as shown in FIG. 1 of the drawings. At its opposite or second end, the wire shaft 14 carries another loop or eye 18 which is used for the purpose of pivotally attaching thereto, the eye at the end of the shank of a treble hook, denominated generally by reference numeral 20. A buck tail 22 may be secured around the shank of the treble hook so that the fronds or feathers of the buck tail camoflage the barbs of the hook.

Positioned between the eye 16 and the body 10 along the elongated wire shaft 14 are a plurality of spacer spheres 24. From one to four of these spheres can be employed.

Figure 3:
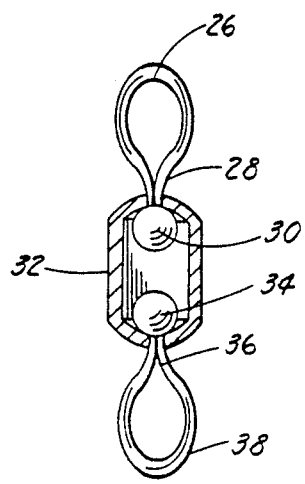
FIG. 3 is a view, partially in section and partially in elevation, of a swivel subassembly utilized in the construction of the lure.

Attached to the span of the elongated wire shaft 14 between the eye 16 and the body 10 is a loop or ring 26 which is attached to, or formed on, one end of a first swivel wire 28, as shown in FIG. 3. The loop or ring 26 extends completely around the elongated wire shaft 14 and enables the first swivel wire 28 to pivot or rotate completely about the axis of the elongated wire shaft 14. Opposite the end portion of the swivel wire 28 at which the loop or ring 26 is formed, the first swivel wire 28 carries a spherical bearing element 30. This spherical bearing element 30 is positioned inside a hollow swivel barrel 32 in the manner shown in FIG. 3. In order to have its second or inner end attached to the spherical bearing element 30, the first swivel wire 28 passes through an opening formed at one side of the swivel barrel 32.

A second spherical bearing element 34 located inside the hollow swivel barrel 32 is attached to a first end of a second swivel wire 36 which carries a loop or ring 38 at its second end. The loop or ring 38 is connected through a connecting ring 40 to a willow leaf-type spinner blade 42. The willow leaf-type spinner blade is a flat shiny polished metallic element.

In the use of the lure of the invention, a retrieving line extending to the rod of the fisherman is attached to the eye 16. The lure is then retrieved by reeling in the line. The depth at which the lure will run in the water is determined by the way it is retrieved, and in general, the speed at which it is retrieved will control the depth at which the lure travels in the water.

As the lure is retrieved, the heavy lead or plastic body 10 will descend downwardly so that the body and the retrieving line extend at an angle to the surface of the water, or, stated differently, to the horizontal. At this time, the willow leaf-type spinner blade 42 will spin vigorously about a horizontal axis at a location above the body 10 of the lure. The swivel assembly is attached through the ring or loop 26 to the wire shaft 14 at the location shown so that the spinner blade 42 can rotate entirely around the wire shaft if this is needed. Normally, however, during retrieve, the spinner blade will be positioned slightly above the body and will rotate rapidly about a horizontal axis as a result of the use of the spherical bearing elements 30 and 34 which are positioned inside the hollow swivel barrel 32.

The lure of the present invention operates advantageously with respect to other spinner baits of a similar type because in those instances, the spinner blade is attached to the elongated wire shaft which passes through the body by means of a clevis rather than a swivel and rotatable eye or loop. By reason of the use of the clevis, such lures are limited to the use of a relatively light weight body in the lure, and the depth to which they can be successfully fished is also limited. In general, the heavier the body of the lure and, indeed, the entire lure, the deeper in the water it will run and the steeper the angle will be which the retrieving line of the lure makes with respect to the horizontal. A spinner blade attached to the elongated wire shaft by the use of a clevis must therefore rotate around the shaft in order for the blade to rotate and effectively function as a spinner should. In the case of the present invention, the spinner blade assembly employed uses a double swivel and enables the spinner blade to rotate totally independently of any movement on or about the shaft. In general, the more weight and the steeper the angle made with the horizontal, the better action is realized from the rapidly rotating spinner blade. The spinner blade which is attached to the elongated wire shaft with the clevis will even totally fail to rotate when the angle defined between the extended body and the retrieving line with the horizontal is great. With the lure of the present invention, however, the greater the angle defined between the retrieving line and the horizontal, the better the spinner blade functions.

I claim:

1. A fishing lure which includes:

a body;

an elongated rigid wire shaft extending centrally through said body and projecting from opposite ends of the body and having a first end and a second end;

an eye on said first end of said wire shaft spaced from said body for attaching a retrieving line to said lure via said eye;

at least one spherical spacer element between said first end of said wire shaft and said body;

a spinner blade assembly connected to a span of said wire shaft between said eye and said spherical spacer element, said spinner blade assembly including:

a hollow swivel barrel having a pair of wire openings in opposite sides thereof;

a first swivel wire having first and second ends, and having a single loop on said first end of said first swivel wire extending around said elongated wire shaft at a location between said eye and said one spherical spacer element, said first swivel wire extending through one of said wire openings into said swivel barrel and having its second end within said hollow swivel barrel;

a first swivel ball secured to the second end of said first swivel wire and located inside of said swivel barrel so that said swivel barrel can swivelly rotate therearound;

a second swivel ball located inside said swivel barrel so that said swivel barrel can swivelly rotate therearound.

a second swivel wire having a first end connected to said second swivel ball and having a second end in the form of a loop;

a spinner blade connected to the loop at the second end of said second swivel wire; and a hook pivotally connected to the second end of said wire shaft.

* * * * *